United States Patent [19]

McMillan

[11] 4,267,995
[45] May 19, 1981

[54] WIRE HOLDER

[76] Inventor: Ronald R. McMillan, Box 114, Jewell, Kans. 66949

[21] Appl. No.: 82,608

[22] Filed: Oct. 9, 1979

[51] Int. Cl.³ .............................................. F16L 3/08
[52] U.S. Cl. ............................ 248/74 R; 174/153 G; 248/56
[58] Field of Search ............ 248/56, 159, 314, 74 R, 248/74 A; 174/153 G, 65 G; 16/2; 285/159; 24/265 R; 211/45, 89

[56] References Cited

U.S. PATENT DOCUMENTS

| 1,952,695 | 3/1934 | Webb et al. | 248/56 UX |
| 2,382,970 | 8/1945 | Borcherdt | 248/56 |
| 2,513,846 | 7/1950 | Collins | 248/314 |
| 2,613,000 | 10/1952 | Moore | 248/314 UX |
| 2,665,146 | 1/1954 | Berg et al. | 248/56 X |
| 3,135,535 | 6/1964 | Shepard | 248/56 X |
| 3,245,428 | 4/1966 | Klimak et al. | 174/153 G |
| 3,518,359 | 6/1970 | Trimble et al. | 174/153 G |

FOREIGN PATENT DOCUMENTS 550936  2/1943  United Kingdom ........... 174/153 G

Primary Examiner—J. Franklin Foss
Attorney, Agent, or Firm—John H. Widdowson

[57] ABSTRACT

A wire holder for holding a bundle of wires having a base, a rim integrally bound to the base, and a plurality of overlapping elastic members mounted in the rim for receiving and holding the bundle of wires.

3 Claims, 8 Drawing Figures

U.S. Patent  May 19, 1981  Sheet 1 of 2  4,267,995
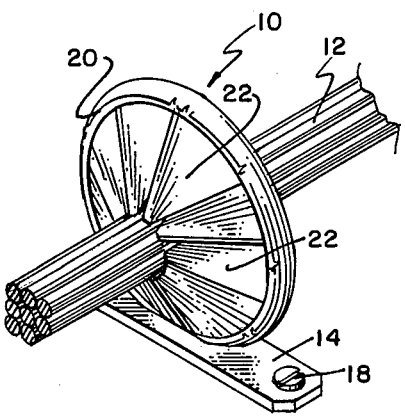
FIG. 1
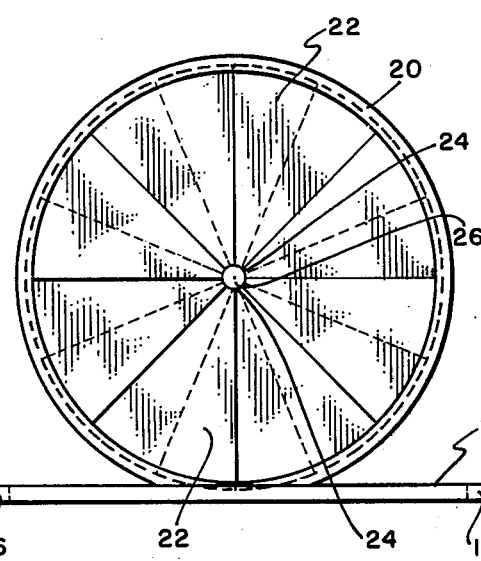
FIG. 2
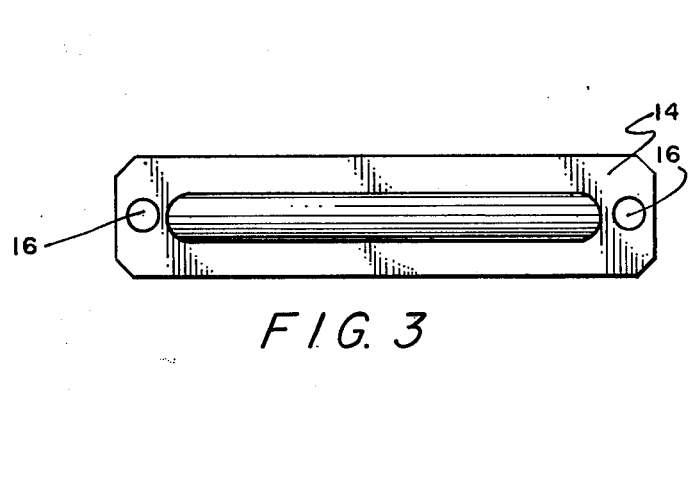
FIG. 3
FIG. 4

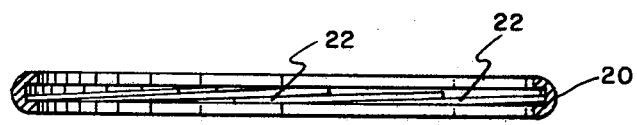
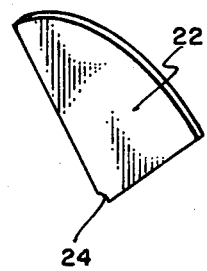
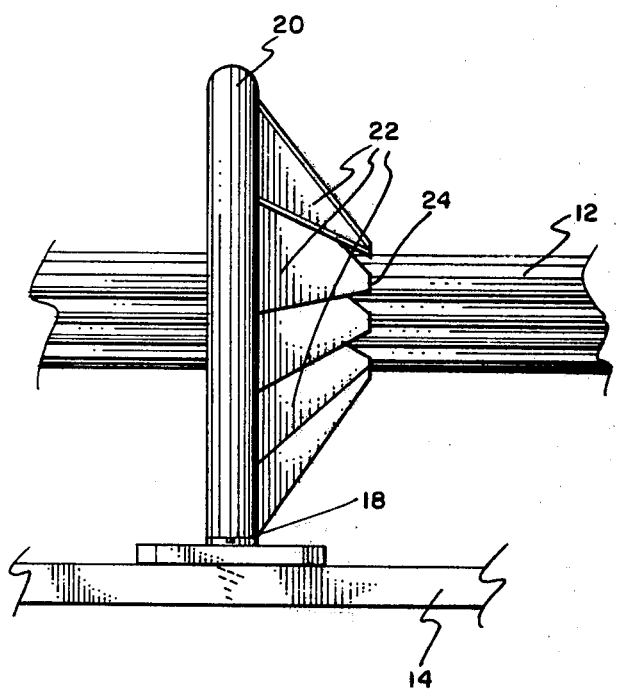
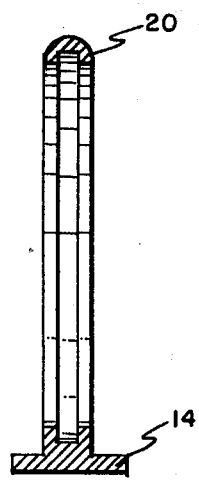

WIRE HOLDER

BACKGROUND OF THE INVENTION

1. Field of the Invention

This invention relates to a holder or restrainer for wires. More specifically, this invention provides a wire holder for holding a bundle of wires.

2. Description of the Prior Art

U.S. Pat. No. 2,683,578 by Rainey discloses a rock formed of elastomeric material. U.S. Pat. No. 3,135,535 Shepard illustrates a closure or boot having a plurality of openings for the passage of electrical lives. U.S. Pat. No. 2,382,970 by Borcherdt discloses a holder for cables that extend through an aperture in a bulkhead. U.S. Pat. No. 3,995,795 by Hogan illustrates a support for a plurality of wires that has a sawtooth configuration. None of these patents disclose the wire holder of this invention.

SUMMARY OF THE INVENTION

It is therefore an object of this invention to provide a wire holder for holding a bundle of wires.

It is another object of this invention to provide a wire holder having simplicity in functionality and being economical to manufacture.

Still other objects will be apparent to those skilled in the art from the following description of this invention.

The foregoing objects are achieved according to the practice of this invention. Broadly, this invention comprises a wire holder for holding a bundle of wires and includes a base, and a rim integrally bound to the base. A plurality of overlapping generally triangular shaped elastic members is provided. Each elastic member has a base and an apex. The base of each elastic member is mounted in the rim to have the members radially disposed with respect to the rim. In a closed position the elastic members essentially define a plane. The members unidirectionally flare when receiving and holding the bundle of wire. The elasticity of each member, when holding the bundle of wires, biases the members toward the closed position for firmly gripping, holding and restraining the bundle.

The advantages and objects of the invention will become evident from the following detailed description when read in conjunction with accompanying drawings which illustrate the preferred embodiments of the invention:

BRIEF DESCRIPTION OF THE DRAWINGS

FIG. 1 is a perspective view of the invention holding a bundle of wires;

FIG. 2 is a front or rear elevational view of the invention in a closed position;

FIG. 3 is a top plan view of the invention;

FIG. 4 is a side elevational view of the invention;

FIG. 5 is a horizontal sectional view of the overlapping members of the invention in a closed position;

FIG. 6 is a perspective view of a triangular shaped elastic member;

FIG. 7 is a side elevational view of the invention showing the elastic members flared and holding the bundle of wire; and FIG. 8 is a vertical sectional view of the invention with the overlapping members removed from the rim.

DETAILED DESCRIPTION OF THE INVENTION

Referring in detail now to the drawings, wherein like reference numerals designate similar parts throughout the various views, there is seen a wire holder, generally illustrated as 10, for holding a bundle of wires 12. Holder 10 has a base 14 with apertures 16 for receiving fasteners 18. A rim 20 is integrally bound to the base 14. A plurality of overlapping triangular shaped members 22 are mounted in the rim 20 such as to have members 22 radially disposed thereto. The members 22 have an apex 24 and are constructed of any material (preferably plastic) such as to be elastic. In a closed position the members 22 define a plane (see FIGS. 2, 3, 4, 5 and 8). When the bundle 12 is fed between members 22 and through the holder 10 (see FIGS. 1 and 7), the members 22 overlapping flare unidirectionally and the elasticity of each member 22 is of such a predetermined magnitude (depending on the weight of bundle 12) such as to bias the members 22 toward the closed position in order to firmly hold the bundle 12. In the closed position, the apices 24 of the members 22 meet in the center of the rim 20 to define an aperture 26 (see FIG. 2).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A wire holder for holding a bundle of wires comprising a base; a rim integrally bound to said base; a plurality of overlapping generally triangular shaped elastic members, each elastic member having a base and an apex, said base of each elastic member being mounted in said rim to have said members radially disposed with respect to said rim, said elastic members in a closed position essentially define a plane and unidirectionally flaring when receiving and holding said bundle, said elasticity of each member when holding said bundle bias said members toward said closed position for firmly gripping, holding, and restraining said bundle.

2. The wire holder of claim 1 additionally including said apices of said members in the closed position meeting to define an aperture centrically positioned with respect to said rim.

3. The wire holder of claim 2 wherein said base has a structure defining a plurality of apertures.

* * * * *